United States Patent
Nobuchika et al.

(10) Patent No.: US 7,857,926 B2
(45) Date of Patent: Dec. 28, 2010

(54) METHOD FOR MANUFACTURING PNEUMATIC TIRE

(75) Inventors: Hideo Nobuchika, Kobe (JP); Masayuki Sakamoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 701 days.

(21) Appl. No.: 11/907,266

(22) Filed: Oct. 10, 2007

(65) Prior Publication Data

US 2008/0087368 A1 Apr. 17, 2008

(30) Foreign Application Priority Data

Oct. 11, 2006 (JP) ............................. 2006-277990

(51) Int. Cl.
*B29D 30/16* (2006.01)
*B29D 30/10* (2006.01)

(52) U.S. Cl. .................. 156/79; 152/450; 156/117; 156/123; 156/130.5; 156/133; 156/414

(58) Field of Classification Search .................. 156/79, 156/117, 123, 130.5, 133, 414, 417; 152/450, 152/510
See application file for complete search history.

(56) References Cited

U.S. PATENT DOCUMENTS

| | | | | |
|---|---|---|---|---|
| 5,591,288 A | * | 1/1997 | Becker et al. | 156/130.7 |
| 6,113,833 A | * | 9/2000 | Ogawa | 264/326 |
| 7,694,707 B2 | * | 4/2010 | Agostini et al. | 152/510 |
| 2005/0133132 A1 | * | 6/2005 | Girard et al. | 152/152.1 |
| 2006/0185777 A1 | | 8/2006 | Tanno | |

FOREIGN PATENT DOCUMENTS

| | | |
|---|---|---|
| DE | 198 06 935 A1 | 9/1999 |
| EP | 1 253 025 A2 | 10/2002 |
| EP | 1 800 911 A2 | 6/2007 |
| JP | 1-254411 A | 10/1989 |
| JP | 2003-285607 A | 10/2003 |
| JP | 2003-326915 A | 11/2003 |

* cited by examiner

*Primary Examiner*—Geoffrey L Knable
(74) *Attorney, Agent, or Firm*—Birch, Stewart, Kolasch & Birch, LLP (57) ABSTRACT

A method for manufacturing a pneumatic tire with a noise damper on the inside of the tread portion, comprises the steps of: building a raw tire on an annular tire building core; placing the raw tire within a vulcanizing mold together with the core; and heating the raw tire in the mold. The tire building core has a molding face for molding an inner surface of the tread portion. The molding face is provided with a groove extending in the tire circumferential direction. In the step of building the raw tire, an expandable damper material is placed in the groove. During heating the raw tire to be vulcanized, the damper material expands in the groove, whereby the expanded material forms the noise damper integrated into the radially inside of the tread portion.

4 Claims, 14 Drawing Sheets

METHOD FOR MANUFACTURING PNEUMATIC TIRE

BACKGROUND OF THE INVENTION

The present invention relates to a method for manufacturing a pneumatic tire provided on the radially inside of the tread portion with a noise damper, more particularly to a technique for molding the noise damper during vulcanizing the tire.

Pneumatic tires provided on the radially inside of the tread portion with a noise damper made of foamed material has been proposed in order to damp resonance of air in the annular tire cavity. Thus, tire noise during running can be reduced.

In the laid-open Japanese patent application No. 2003-285607, a method for manufacturing a pneumatic tire of this kind is disclosed, wherein an expandable material for the noise damper is applied to the inner surface of an unvulcanized tire; the unvulcanized tire is put in a mold; an inflatable bladder is set in the tire hollow; and the bladder is inflated during heating the tire to thereby mold and vulcanize the tire and at the same time expand the expandable damper material.

In this method, the inflated bladder presses the expandable damper material. Further, irrespective of partially or wholly, the tire is pressed onto the inside of the mold indirectly through the expandable material. Thus, it is very difficult to achieve dimensionally accurate, sufficient foaming of the expandable material and accurate molding of the tire at the same time.

SUMMARY OF THE INVENTION

It is therefore, an object of the present invention to provide a method for manufacturing a pneumatic tire, by which an expandable damper material can expand accurately and sufficiently, and accordingly an effective noise damper can be formed and at the same time the tire can be molded accurately.

According to the present invention, a method for manufacturing a pneumatic tire with a noise damper, comprises the steps of:

building a raw tire on an annular tire building core, the tire building core having a molding face for molding an inner surface of a tread portion of the tire, and the molding face provided with a groove extending in the tire circumferential direction, wherein the building of the raw tire includes placing an expandable damper material in the groove;

placing the raw tire, which is built up on the annular tire building core, within a vulcanizing mold together with the tire building core; and heating the raw tire, which includes the expandable damper material, so that the raw tire is vulcanized and the expandable damper material expands in the groove, whereby the expanded material forms the noise damper integrated into the radially inside of the tread portion.

BRIEF DESCRIPTION OF THE DRAWINGS

FIG. 4(A) and FIG. 4(B) show an example of a raw carcass ply in the form of a circumferentially continuous strip, wherein

FIG. 5(A) and FIG. 5(B) show another example of the raw carcass ply made up of circumferentially separated pieces, wherein

DESCRIPTION OF THE PREFERRED EMBODIMENTS

Embodiments of the present invention will now be described in detail in conjunction with the accompanying drawings.

Figure 1:
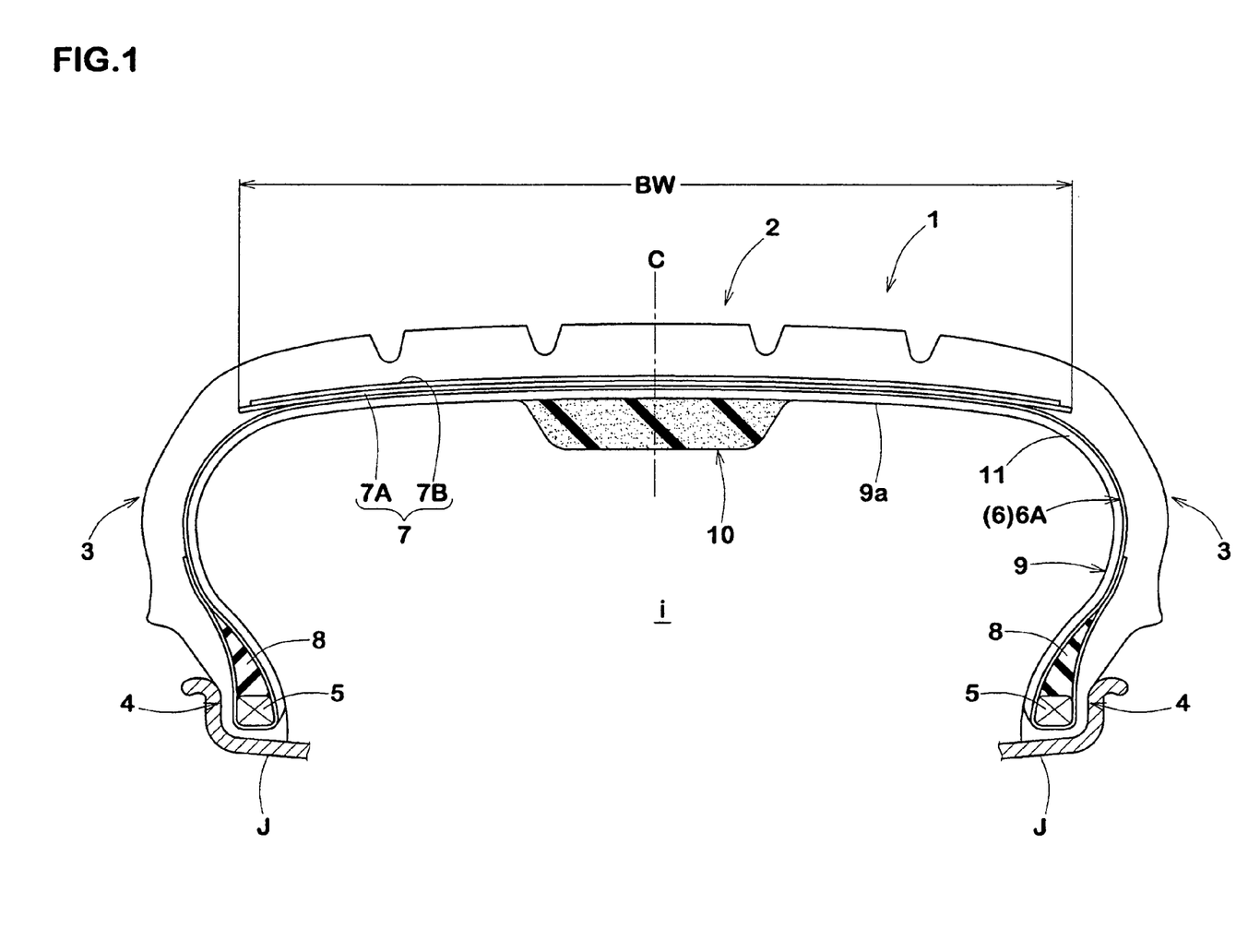
FIG. 1 is a cross sectional view of a pneumatic tire manufactured by a method according to the present invention.

In FIG. 1 showing a pneumatic tire 1 manufactured by a method according to the present invention, the tire 1 comprises a tread portion 2, a pair of sidewall portions 3, a pair of bead portions 4 each with a bead core 5 therein, a carcass 6 extending between the bead portions 4, a belt 7 disposed radially outside the carcass 6 in the tread portion 2, and a noise damper 10 disposed radially inside the carcass 6 in the tread portion 2.

For example, the tire 1 is a radial tire for passenger cars. The carcass 6 comprises a ply 6A of radially arranged cords extending between the bead portions 4 through the tread portion 2 and sidewall portions 3, and turned up around the bead core 5 in each bead portion 4 from the inside to the outside of the tire.

The belt comprises a breaker 7 and optionally a band disposed on the radially outside of the breaker 7. The breaker 7 comprises two cross plies 7A and 7B of parallel cords.

The bead portions 4 are each provided with a bead apex 8 made of a hard rubber extending radially outwardly from the bead core 5 while tapering towards its radially outer end.

An inner liner 11 made of an air-impermeable rubber is disposed on the inside of the carcass so as to extend over the almost entire inner surface of the carcass 6.

The noise damper 10 in this example is disposed on the radially inside of the inner liner 11 in the tread portion 2.

The noise damper 10 extends continuously in the tire circumferential direction, with a substantially constant cross sectional shape. However, the noise damper 10 may be formed discontinuously in the tire circumferential direction, namely, may be formed as circumferentially separated pieces.

As to the cross sectional shape, various shapes can be employed. But, preferably a low-aspect-ratio shape such that the maximum axial width is lager than the maximum radial thickness is employed. The noise damper 10 is disposed within the width BW of the belt 7. In view of weight balance, a shape which is substantially symmetrical about the tire equatorial plane C is preferred. In this example, therefore, a flat symmetrical trapezoidal shape is used, which is centered on the tire equator, and of which axial width gradually decreases radially inwards.

The noise damper 10 is made of a spongelike porous material of an open-cell type or a closed-cell type. Preferably, an open-cell type porous material is used. The volume of the noise damper 10 is preferably set in a range of from 1 to 20% of the total volume of the tire cavity (i) defined by the tire and the wheel rim on which the tire is mounted.

According to the present invention, the tire 1 is manufactured as follows: a raw tire 30 is assembled by the use of a tire building core 12; the raw tire 30 assembled on the tire building core 12 is put in a mold M together with the tire building core 12; and the raw tire 30 is vulcanized.

Figure 2:
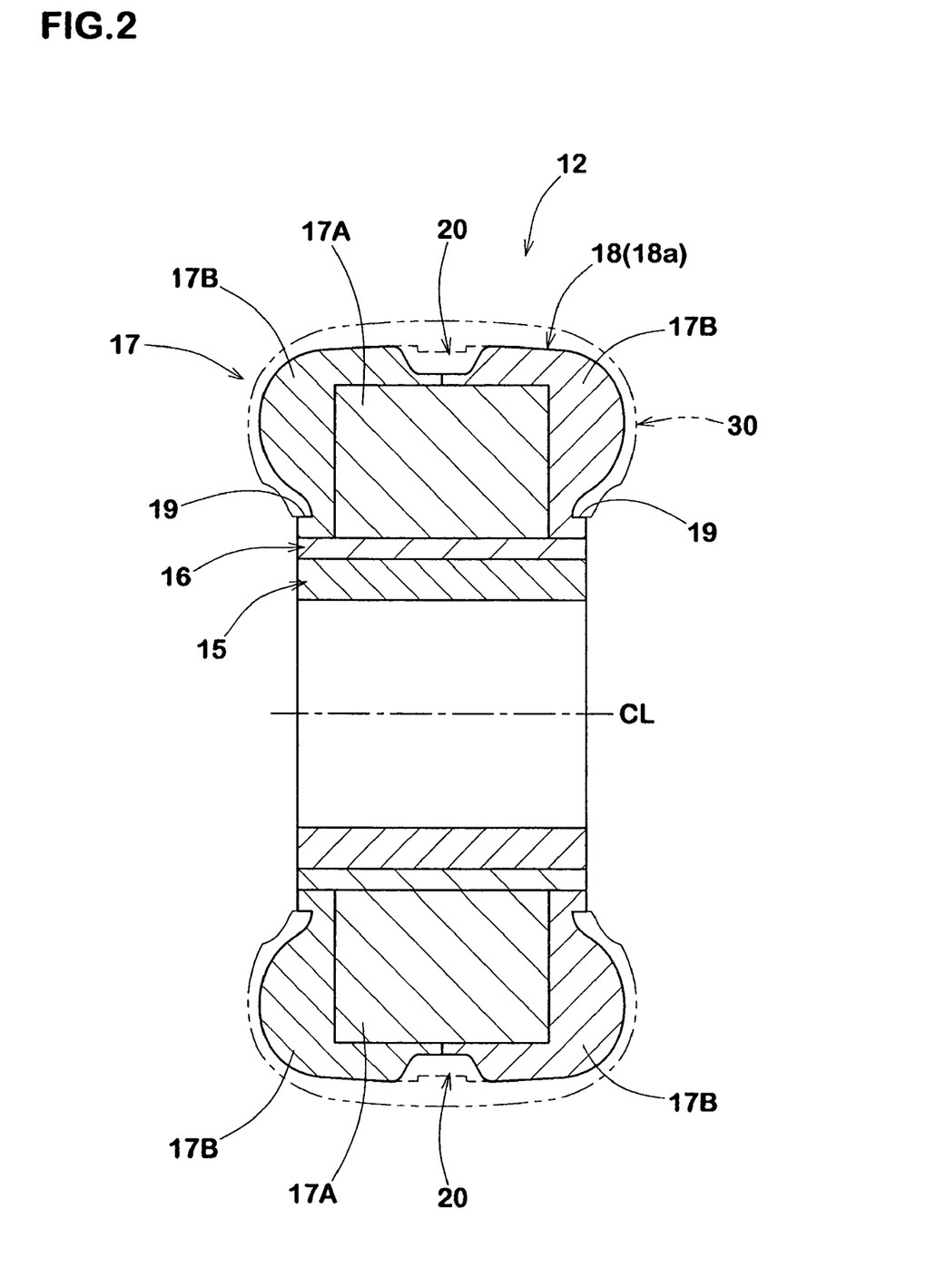
FIG. 2 is a schematic cross sectional view of a tire building core which can be used in the method according to the present invention.

The tire building core 12 is a split core comprising:
a circular inner ring 15 coaxial with a tire rotational axis CL;
a circular middle ring 16 disposed over the inner ring 15; and
a circular outer ring 17 disposed over the middle ring 16.

The outer ring 17 is made up of: inner sector pieces 17A positioned in the widthwise center of the outer ring 17; and outer sector pieces 17B disposed over the outside of the inner sector pieces 17A.

In order to remove the core 12 from the vulcanized tire, the core 12 can be disassembled by:
removing the inner ring 15 by moving axially;
removing the middle ring 16 by moving axially;
removing the inner sector pieces 17A in sequence by moving radially inwardly; and
removing the outer sector pieces 17B in sequence by moving radially inwardly.

In the assembled state of the tire building core, the outer sector pieces 17B are circumferentially arranged with no space therebetween and collectively form a molding face 18 and a pair of molding faces 19. The molding face 18 is for the tire inner surface 9 facing the tire cavity (i). The molding faces 19 are for the bottom surfaces of the bead portions 4. The molding faces 19 extend axially outwardly from the radially inner ends of the molding face 18.

The molding face 18 is provided with at least one circumferential groove 20 within a part 18a for molding the inner surface 9a of the tread portion 2.

The groove 20 has a cross sectional shape corresponding to that of the noise damper 10 to be molded and also has a corresponding length. In this embodiment, accordingly, the cross sectional shape is trapezoidal, and the groove 20 is circumferentially continuous.

Figure 3:
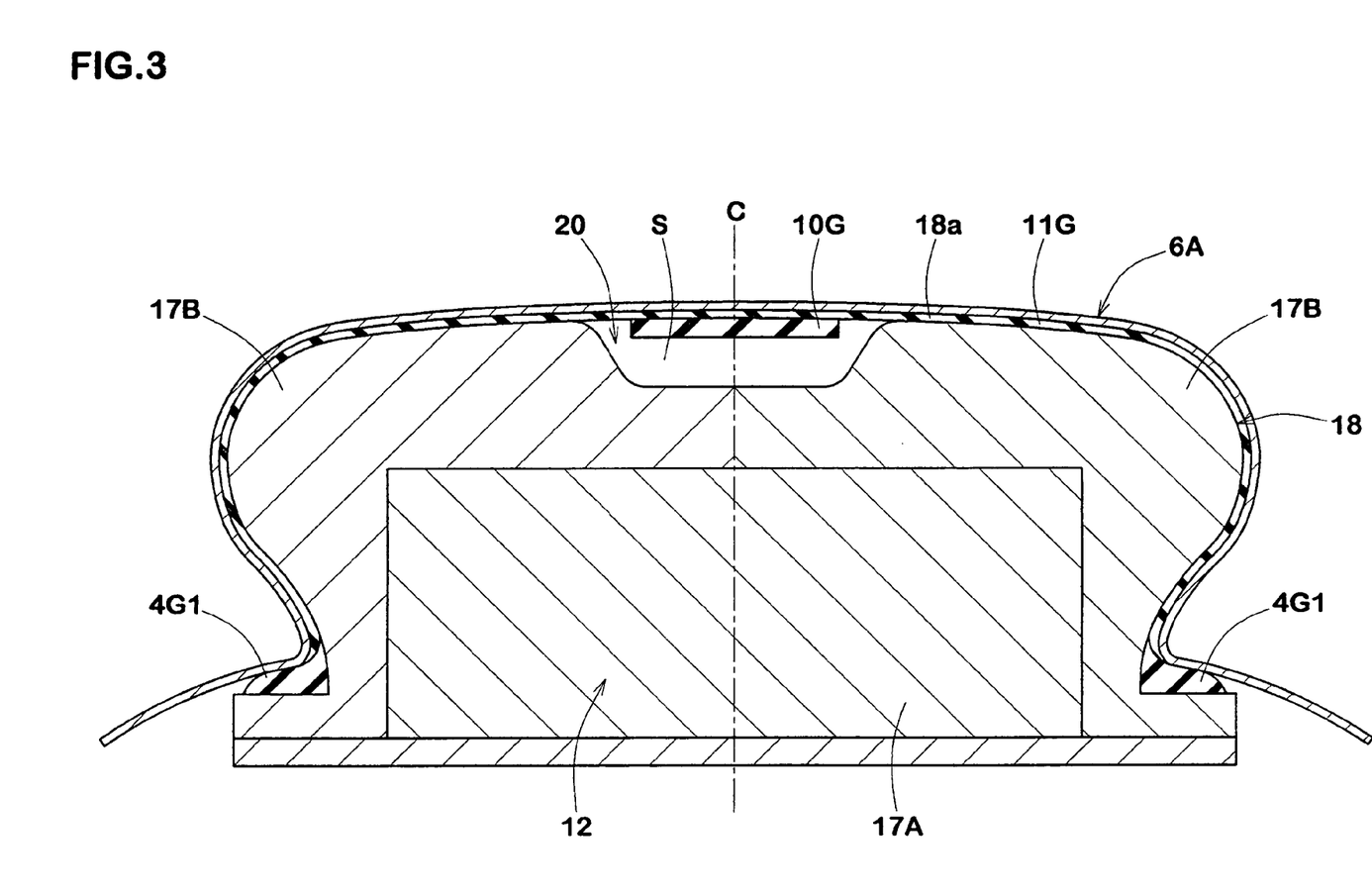
FIG. 3 is an enlarged partial cross sectional view of the tire building core.

In the step of building the raw tire 30, the above-mentioned tire components are assembled in their unvulcanized states (inclusive of semi-vulcanized states). In this embodiment, as shown in FIG. 3, raw bead base rubbers 4G1 forming the bead bottom surface are applied onto the molding faces 19; then a raw inner liner rubber 11G forming the inner liner 11 is applied onto the molding face 18; further the raw carcass ply 6A is applied to the outside of the these rubber components.

In the finished tire 1 in this example, as the noise damper 10 is formed on the radially inside of the inner liner 11, an expandable material 10G forming the noise damper 10 is applied to the raw inner liner rubber 11G prior to the applying of the raw inner liner rubber 11G onto the molding face 18. The applied position of the expandable material 10G corresponds to that of the above-mentioned groove 20.

For the expandable material 10G, various materials can be used insofar as they can expand by the heat during tire vulcanization. But, preferably used is a composition which comprises: at least one kind of polymer such as rubber, resin and elastomer; a blowing agent (or foaming agent) to cause foaming; a reinforcing agent if necessary; and additives.

As to the rubber polymer, natural rubber, isoprene rubber, styrene butadiene rubber, butadiene rubber, chloroprene rubber, acrylonitrile-butadiene rubber, ethylene-propylene rubber and the like can be used alone or in combination.

As to the resin or the elastomer, polyurethane, polyethylene, epoxy resin, unsaturated polyester resin, vinylester resin, phenolic resin, nylon resin, polycarbonate resin and the like can be used alone or in combination.

As to the blowing agent, various agents may be used insofar as they can causes foaming by the heat during vulcanization. For example, azodicarbonamide (ADCA); N,N'-dinitrosopentamethylenetetramine (DPT); 4,4'-oxybis(benzenesulfonylhydrazide) (OBSH) and the like are preferably used. The blowing agent is added together with a blowing aid and the like if necessary.

The amount of the blowing agent is for example, not less than 2 PHR, preferably not less than 3 PHR, but preferably not more than 15 PHR, more preferably not more than 10 PHR.

Figure 4A:
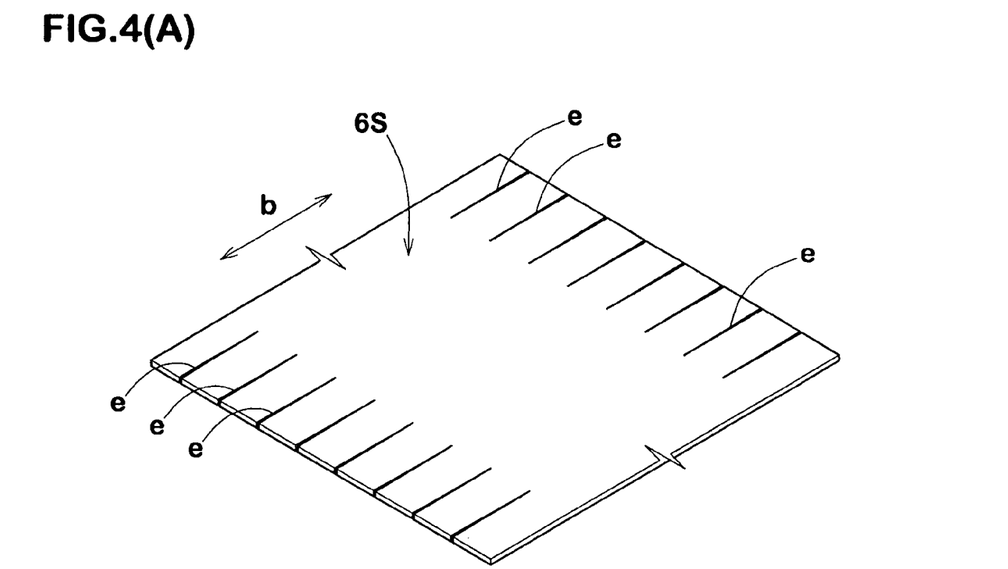
FIG. 4(A) is a perspective view of the raw carcass ply.
Figure 4B:
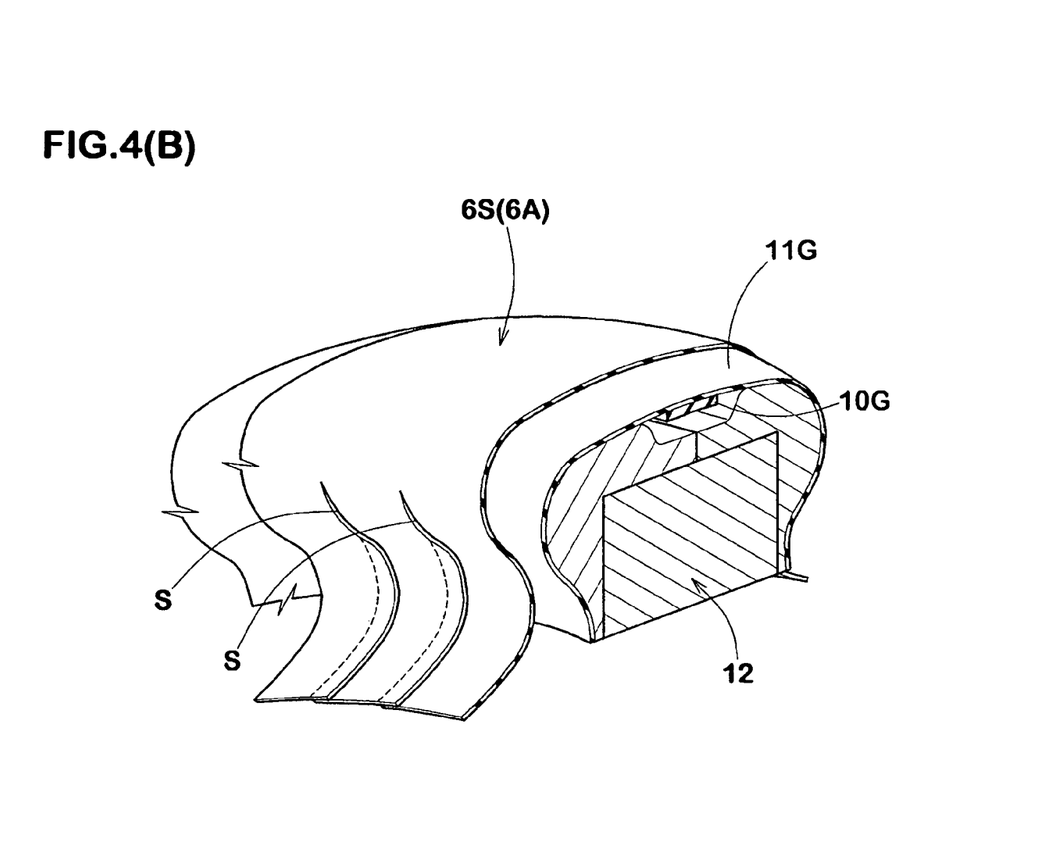
FIG. 4(B) is a perspective view of the raw carcass ply winded around the tire building core.
Figure 5A:
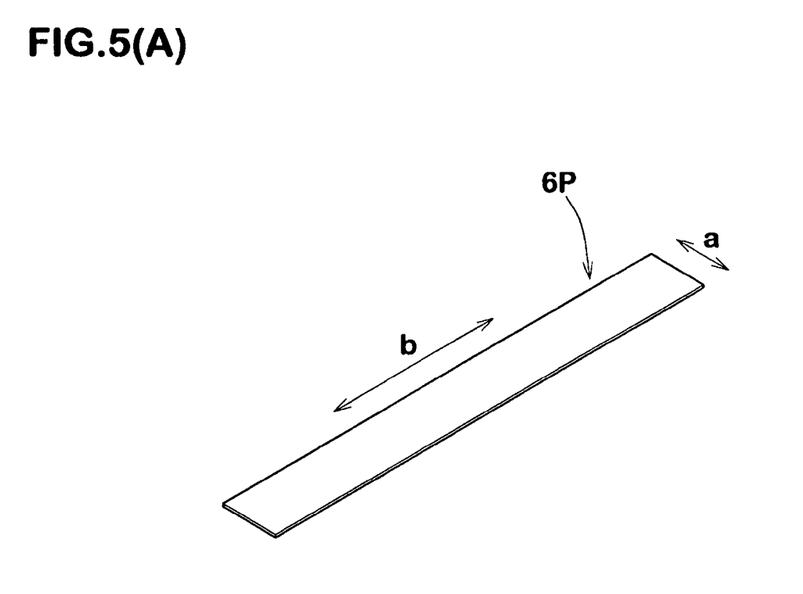
FIG. 5(A) is a perspective view of one of the pieces.
Figure 5B:
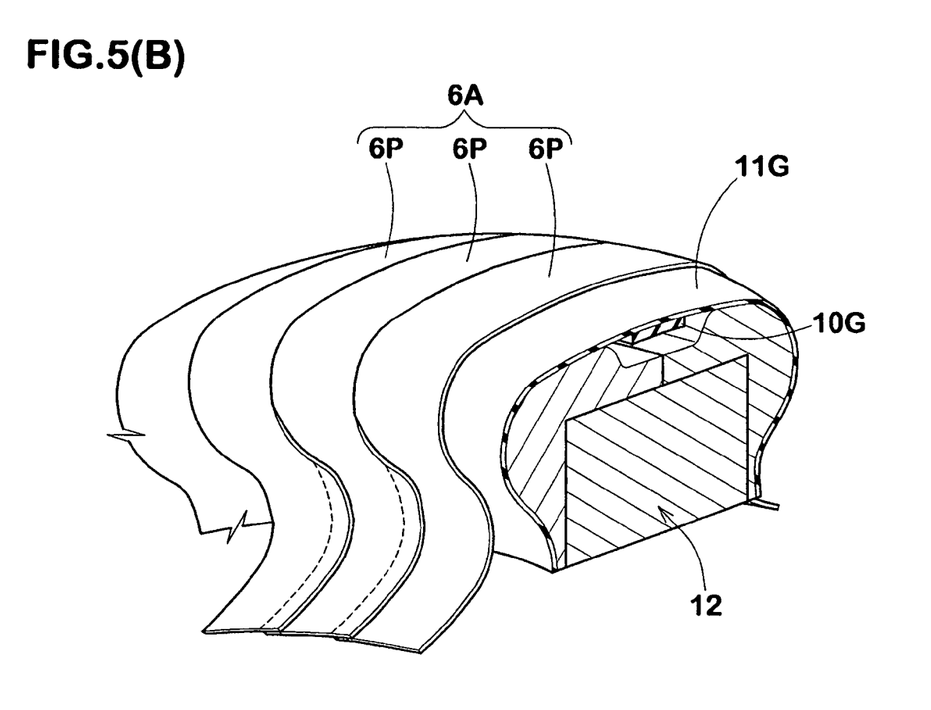
FIG. 5(B) is a perspective view showing the circumferentially arranged pieces.

FIGS. 4(A) and 4(B) show an example of the raw carcass ply 6A. FIGS. 5(A) and 5(B) show another example of the raw carcass ply 6A.

In the example shown in FIGS. 4(A) and 4(B), the raw carcass ply 6A is a strip 6S of rubberized carcass cords similar to that having been used in the conventional tire manufacturing methods. But, differently therefrom, the edges in the widthwise direction (b) are provided with cuts (e) at regular intervals. The cuts (e) are parallel with the embedded carcass cords and positioned between the carcass cords. The strip 6S is winded around the full circumference of the tire building core 12 as shown in FIG. 4(B).

The cuts (e) are utilized to prevent occurrence of wrinkles of the strip in the bead portions. For that purpose, the edges (S) of the portions circumferentially separated by the cuts are overlapped to absorb the difference in the winding diameter.

In the example shown in FIGS. 5(A) and 5(B), the raw carcass ply 6A is made up of a large number of circumferentially separated pieces 6P in contrast to the above-mentioned partially continuous long strip 6S. In each piece 6P, the carcass cords are laid side by side in the direction (a) and extends in the direction (b). The pieces 6P are applied around the full circumference of the core 12 with no space therebetween. In the bead portions, as in the former example, the edges of the pieces 6P can be overlapped in order to prevent occurrence of wrinkles.

In any case, the raw carcass ply 6A is applied such that the edges thereof protrude both sides of the core 12.

Figure 6:
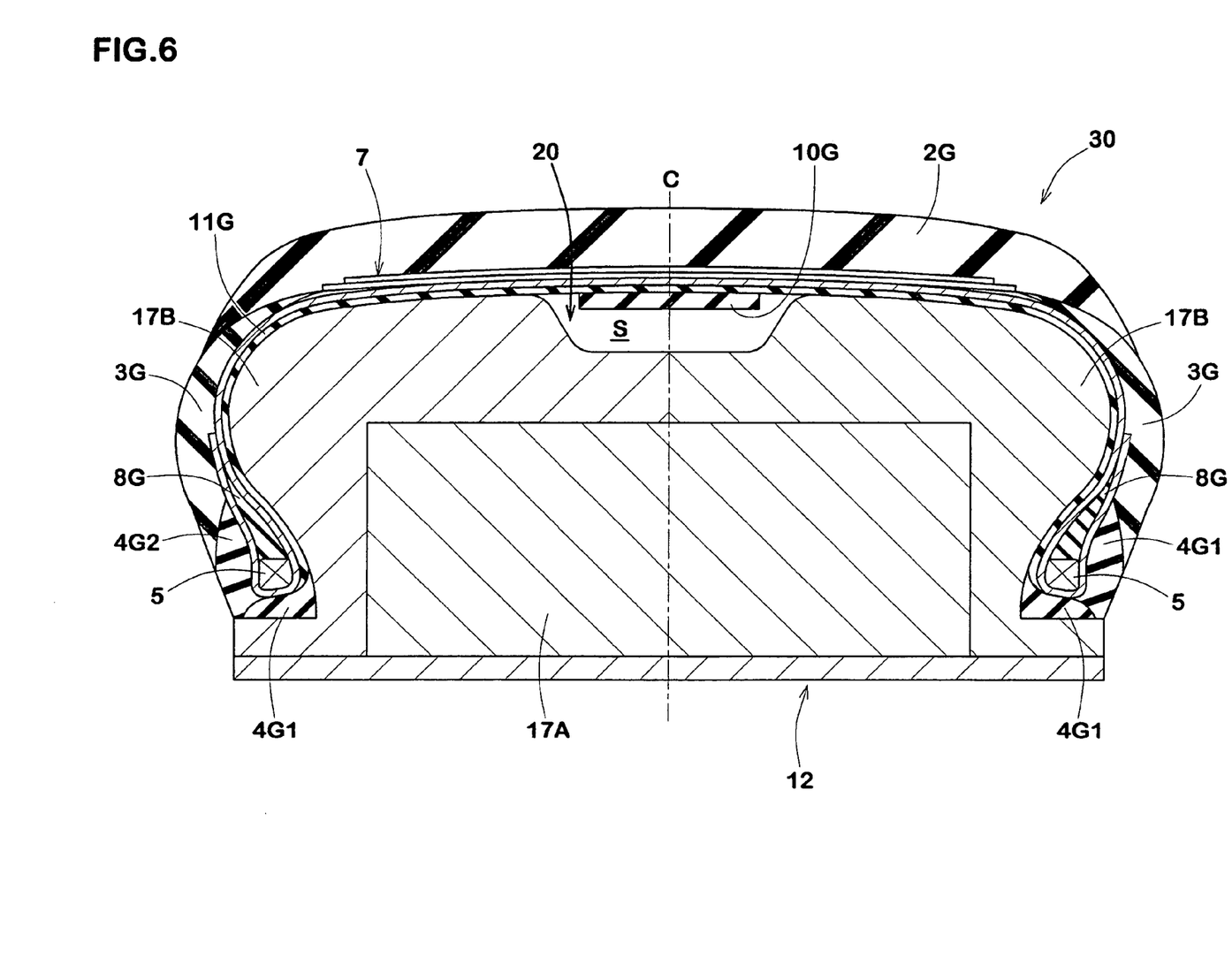
FIG. 6 is a cross sectional view of a raw tire built up on the tire building core.

Then, the annular raw bead cores 5 are disposed one on each side of the toroidal carcass ply main portion applied around the core 12 so that the carcass ply edges protrude through the bead cores 5. Further, the raw bead apex rubbers 8G are applied. The protruding carcass ply edges are winded around the bead cores 5 on to the bead apex rubbers, respectively. Furthermore, axially outer raw bead rubbers 4G2, raw sidewall rubbers 3G, the raw belt 7, a raw tread rubber 2G and the like are applied onto the carcass ply 6A as shown in FIG. 6. Thus, the raw tire 30 is formed on the tire building core 12.

Figure 7:
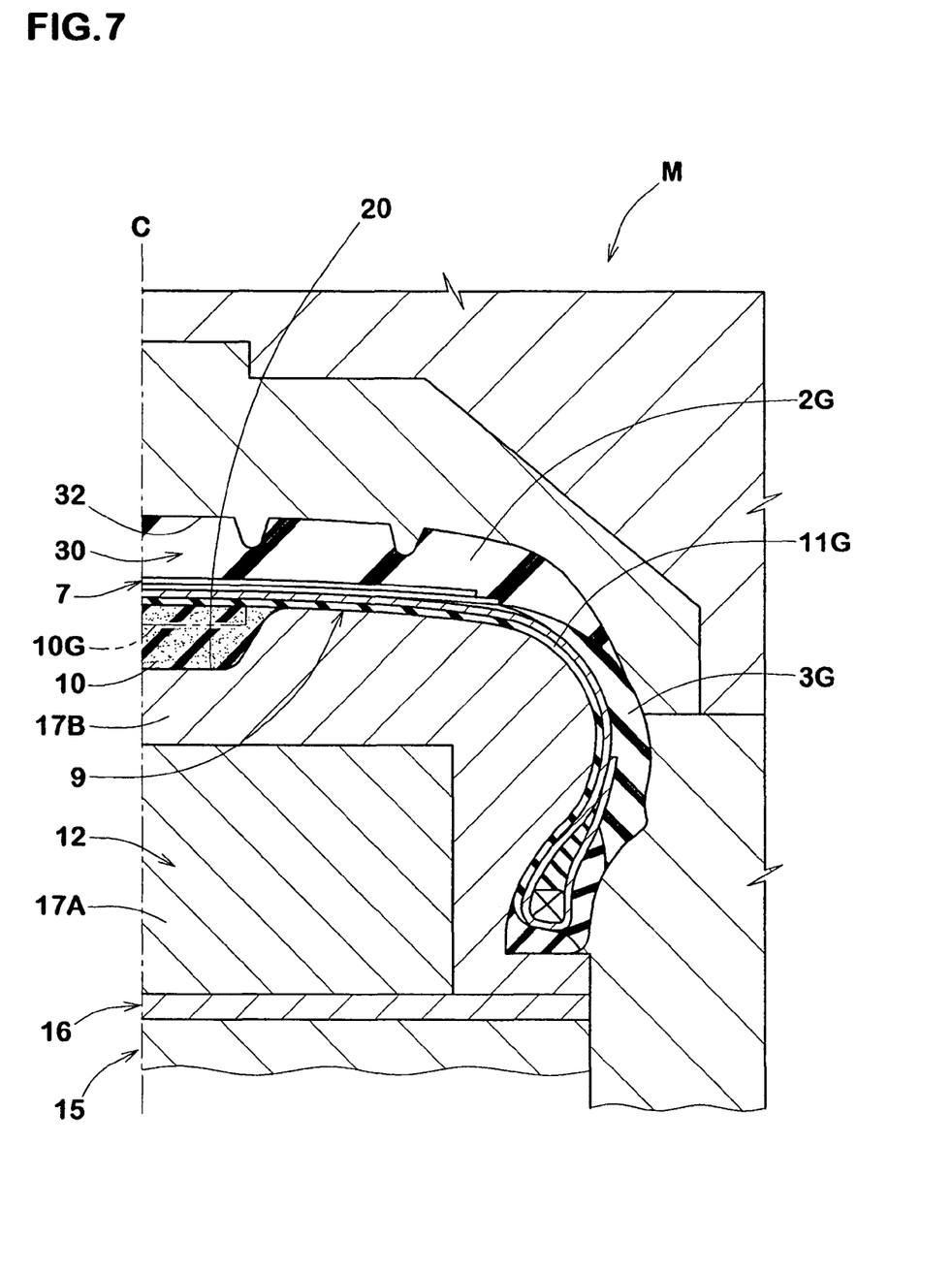
FIG. 7 is a cross sectional view of the raw tire put in a vulcanizing mold together with the tire building core.

Next, the raw tire 30 is, together with the core 12, put in a hollow CV of a vulcanizing mold M splitable radially and axially for example, and subsequently the vulcanizing step is carried out.

In the vulcanizing step, the raw tire 30 is heated to plasticize the rubber portions of the raw tire 30 so as to be molded along the molding face 32 of the mold M and the molding faces 18 and 19 of the core 12, and also to vulcanize the rubber portions.

In order to heat the raw tire 30 from the outside thereof, the temperature of the mold M is raised. Further, it is possible to raise the temperature of the tire building core 12 to heat the raw tire 30 from the inside. In any case, in order to withstand high temperatures during vulcanization, the core 12 is formed of a metal material such as an aluminum alloy.

During the vulcanizing step, when the temperature of the expandable material 10G reaches the specific foaming temperature, the foaming starts and the expanded material 10G fills up the groove 20. Thus, during vulcanization, the expanded material 10G (or noise damper 10) is united with the vulcanized inner liner rubber 11G (or inner liner 11).

After the vulcanizing step, the tire 1 is removed from the vulcanizing mold M together with the core 12. Then, the core 12 is disassembled and removed from the vulcanized tire 1.

Figure 8:
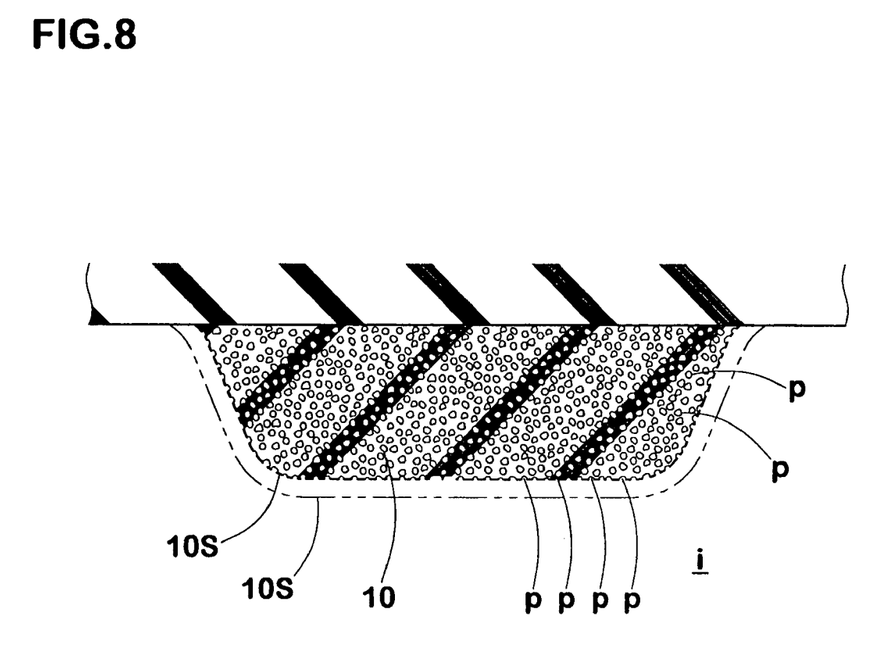
FIG. 8 is an enlarged cross sectional view of the noise damper for explaining a step of opening closed cells existing in the surface layer.
Figure 9:
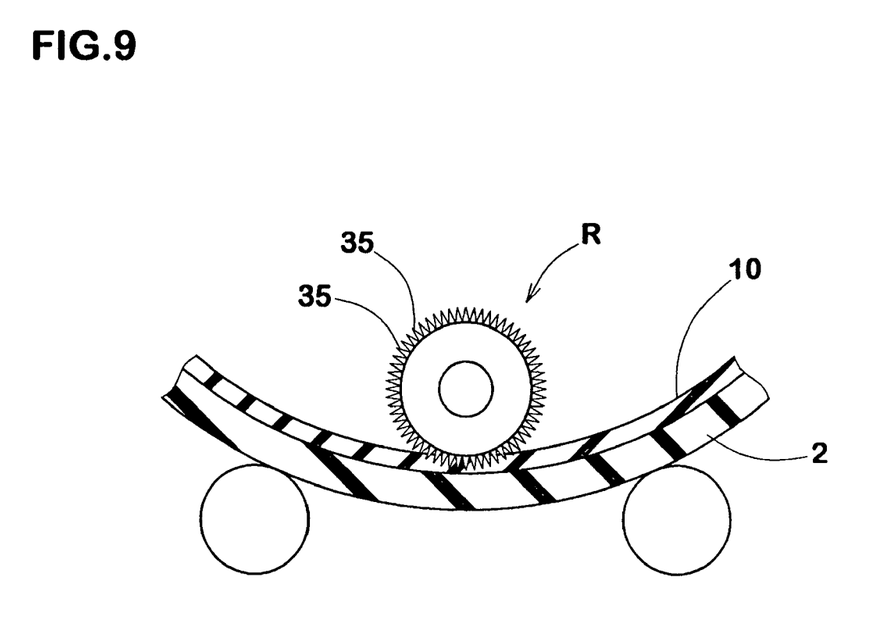
FIG. 9 is a schematic cross sectional view showing another example of the step of opening the closed cells.

In this method, the expanded damper material 10G highly likely becomes a closed-cell type at least at the surface although an open-cell type is preferred as explained above. Therefore, the following additional step (1) and/or (2) is preferably carried out after the vulcanizing step.
(1) The surface 10S of the expanded damper material 10G facing the tire cavity (i) is removed by a small amount to open the closed cells or bubbles (p) existing in the surface layer, as shown in FIG. 8.
(2) As shown in FIG. 9, a roller R provided with a large number of needles 35 planted radially of the roller is moved over the surface 10S of the expanded material 10G while pressing onto the surface 10S so that the needles 35 pierce the closed cells. In this case, the closed cells deep inside the surface 10S may be also opened.

Figure 10:
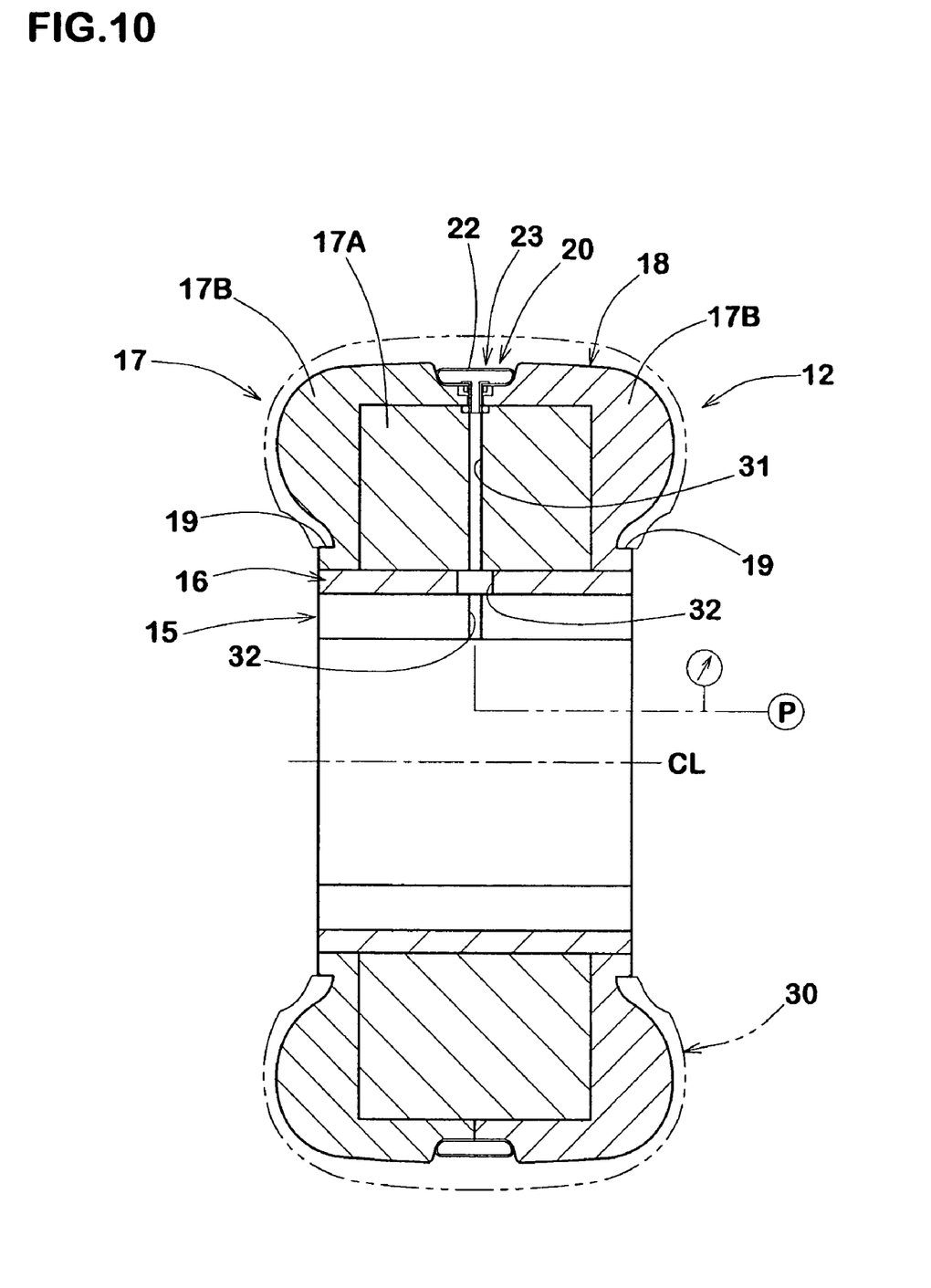
FIG. 10 is a schematic cross sectional view of another example of the tire building core provided with a supporting wall for the expandable damper material.
Figure 11:
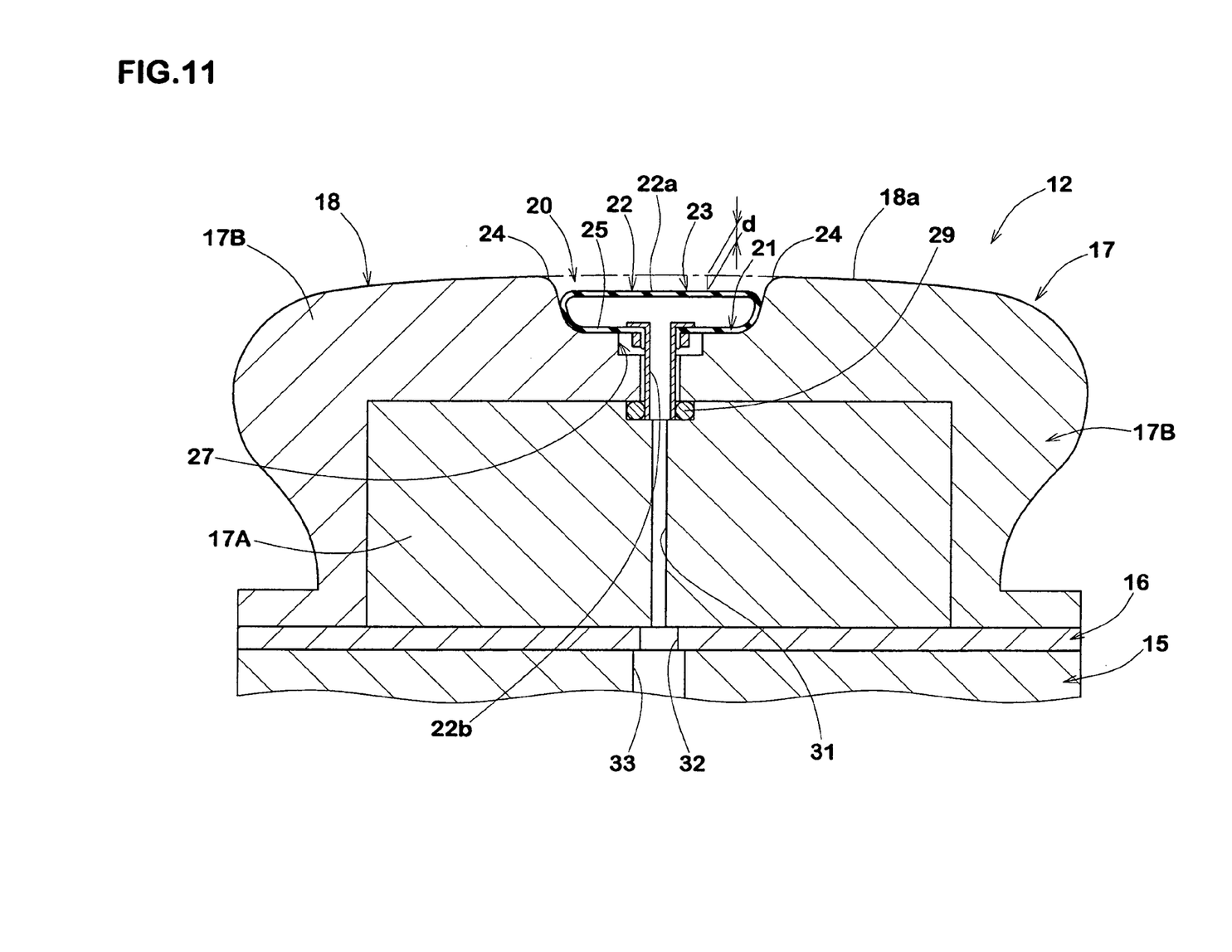
FIGS. 11 and 12 are enlarged partial cross sectional views thereof showing an expanded state and an contracted state of the supporting wall.
Figure 12:
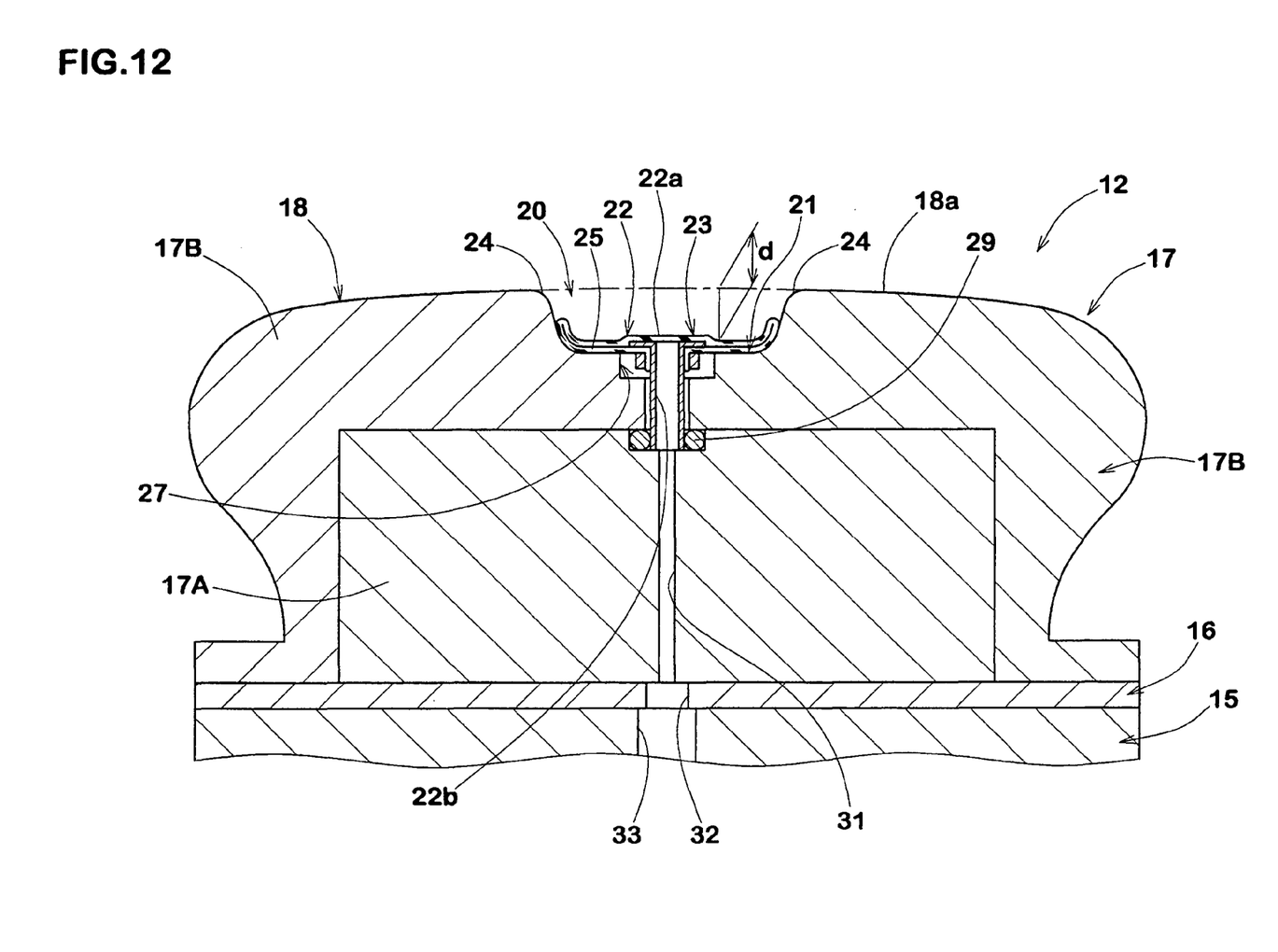

FIG. 10 shows a modification of the tire building core 12 shown in FIG. 2, wherein the groove 20 is provided therein with a supporting wall 23 which can expand (FIG. 11) or contract (FIG. 12) in the radial direction to support the expandable damper material 10G.

Figure 13:
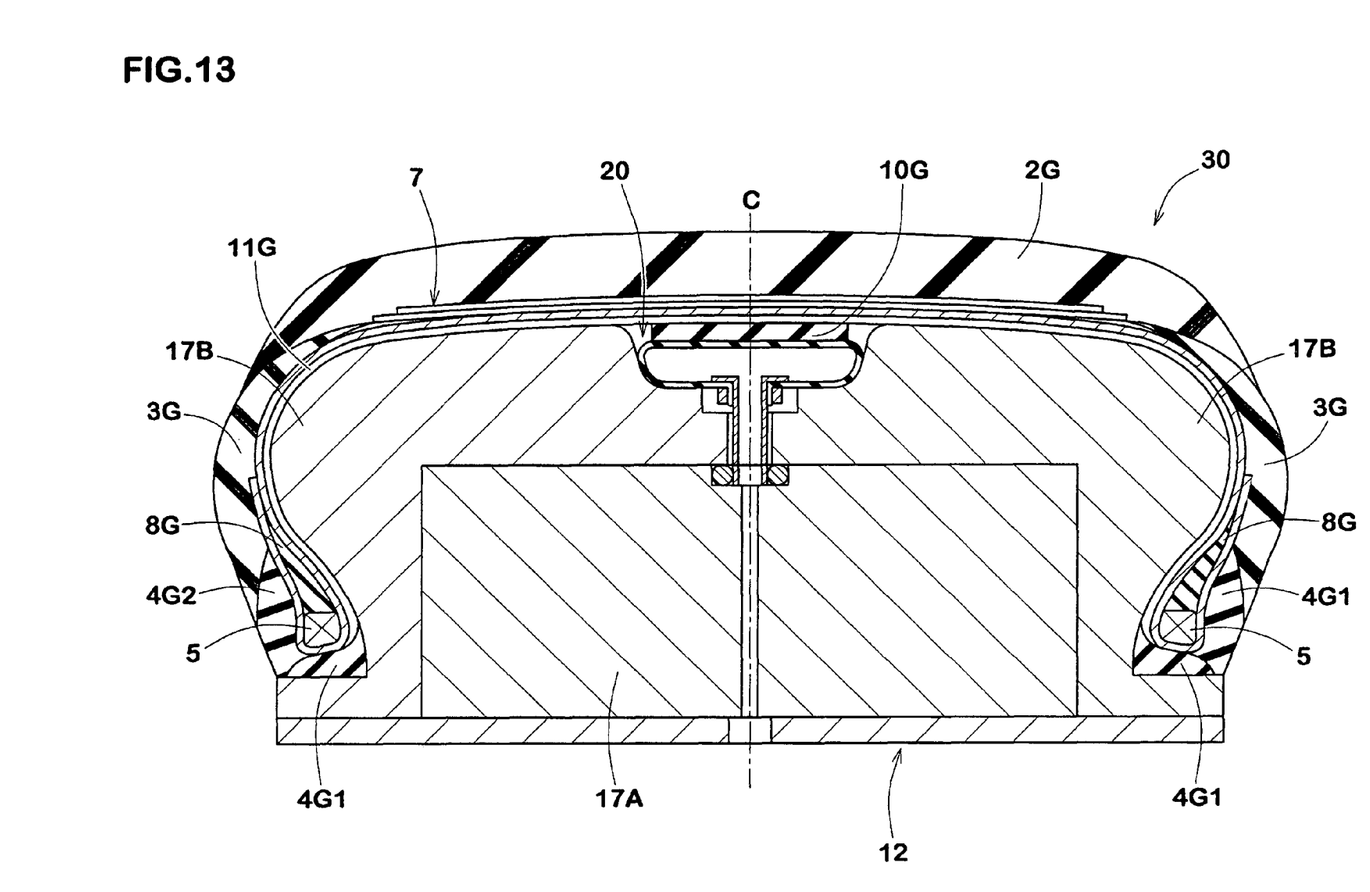
FIG. 13 is a cross sectional view of a raw tire built up on the tire building core with the supporting wall expanded.
Figure 14:
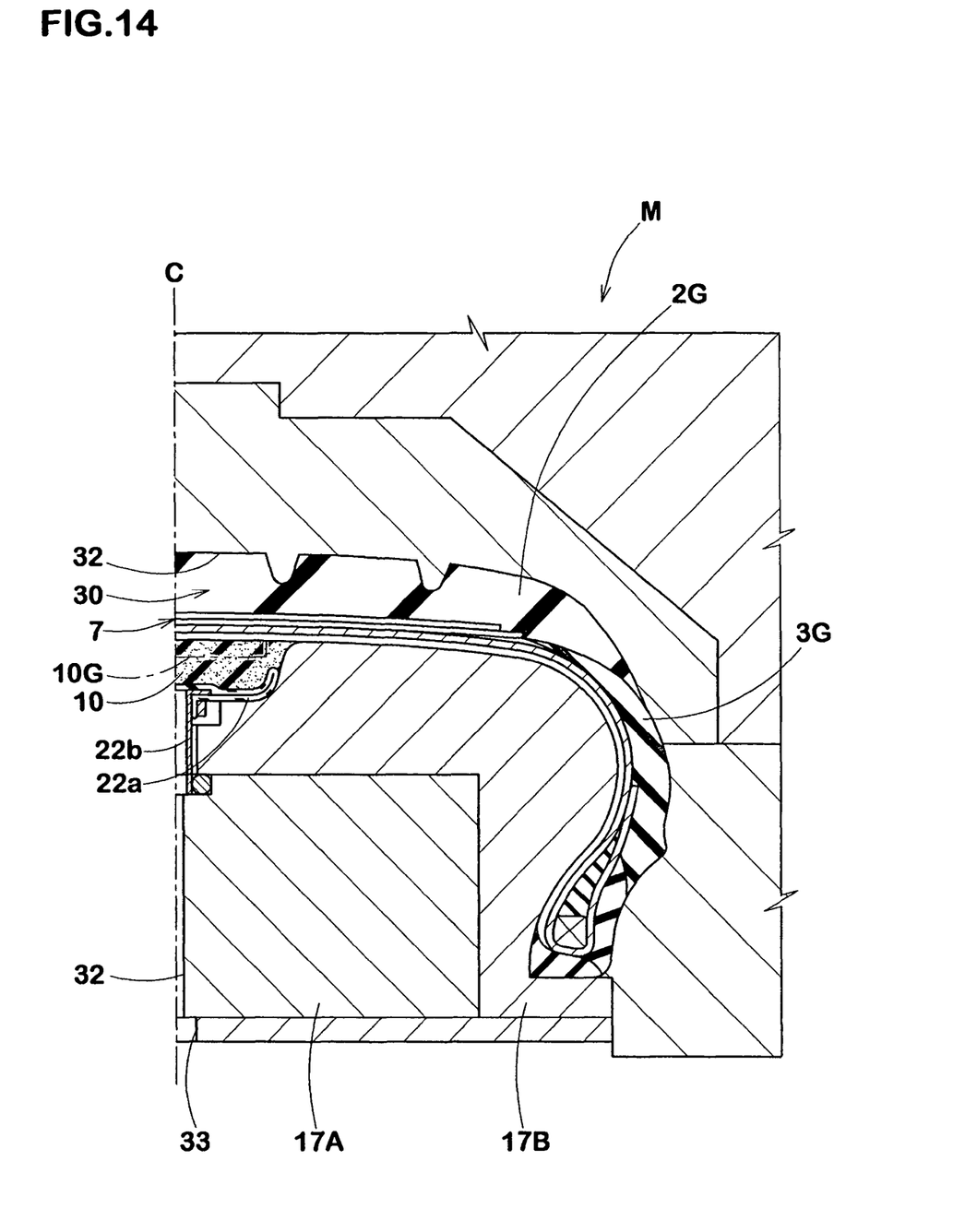
FIG. 14 is a cross sectional view of the raw tire put in the vulcanizing mold together with the tire building core with the supporting wall contracted.

As explained above, in the case that the expandable damper material 10G is applied to the inside of the inner liner rubber 11G prior to applying the inner liner rubber 11G onto the molding face 18, the supporting wall 23 is kept expanded as shown in FIG. 13 to support the inner liner rubber 11G (the depth d thereof is substantially equal to or slightly smaller than the thickness of the material 10G). But during vulcanizing the tire, as shown in FIG. 14, the supporting wall 23 is contracted so that the material 10G can expand sufficiently.

On the other hand, the supporting wall 23 can be utilized to apply the expandable damper material 10G onto the inside of the inner liner rubber 11G as follows.

Firstly, the expandable damper material 10G is applied to the supporting wall 23 expanded. Then, the inner liner rubber 11G is applied onto the molding face 18, covering over the expandable damper material 10G within the groove 20.

Thereafter, the supporting wall 23 is preferably further expanded so as to press and thereby adhere the damper material 10G to the inside of the inner liner rubber 11G.

When this further expansion is carried out, the depth d of the expanded supporting wall 23 may be slightly larger than the thickness of the material 10G. When not carried out, the depth is equal to or slightly smaller than the thickness.

In the example shown in FIGS. 10-14, the supporting wall 23 is formed by an elastic membrane 22a.

The elastic membrane 22a in this example is formed by a radially outer part of an inflatable elastic tube 22 disposed on the groove bottom. The radially inner part and lateral parts of the tube closely contact with the groove bottom 25 and groove side walls 24, respectively.

In the inflated state, the tube has a relatively flat cross sectional shape, and the radially outer part is almost flat.

The radially inner part of the tube 22 is provided with a radially inwardly protruding pipe 22b of which radially outer end communicates with the inside of the tube 22. The pipe 22b is inserted into a stepped hole 27 provided in the groove bottom 25. The stepped hole 27 penetrates the outer sector pieces 17B and reaches to the inner sector piece 17A.

The stepped hole 27 is continued to through holes 31, 32 and 33 provided in the inner sector pieces 17A, the middle ring 16 and the inner ring 15, respectively. Through the through holes 31, 32 and 33, the radially inner end of the pipe 22b is connected with a pressure controller P.

The pressure controller P can feed the inside of the tube 22 with high-pressure air to expand the supporting wall 23.

Further, the pressure controller P can discharge or pump out of the air in the tube to contract the supporting wall 23. Incidentally, gaskets 29 are provided where necessary.

In this example, in order to form the circumferentially continuous noise damper 10, the groove 20 has to be continuous in the circumferential direction. Accordingly, the annular tube 22 is used. However, in the case of the discontinuous noise damper 10, the groove 20 is also discontinuous. Therefore, instead of the annular tube 22, relatively short bladders 22 each provided with the air pipe 22b connected with the air pressure controller P in the same manner as above can be used. In this case, it is further possible to modify the supporting wall 23 such that, instead of the bladders 22, the supporting wall 23 is formed by an actual elastic membrane of which peripheral edge is fixed airtightly to the surrounding groove wall over the entire length of the edge.

Figure 15A:
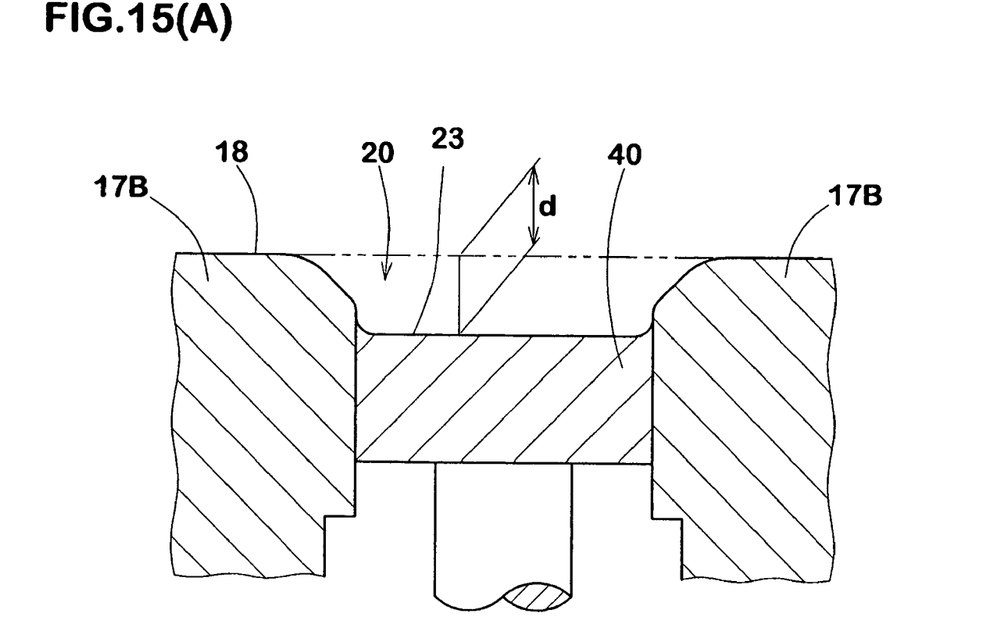
FIGS. 15(A) and 15(B) are schematic cross sectional views of another example of the supporting wall.
Figure 15B:
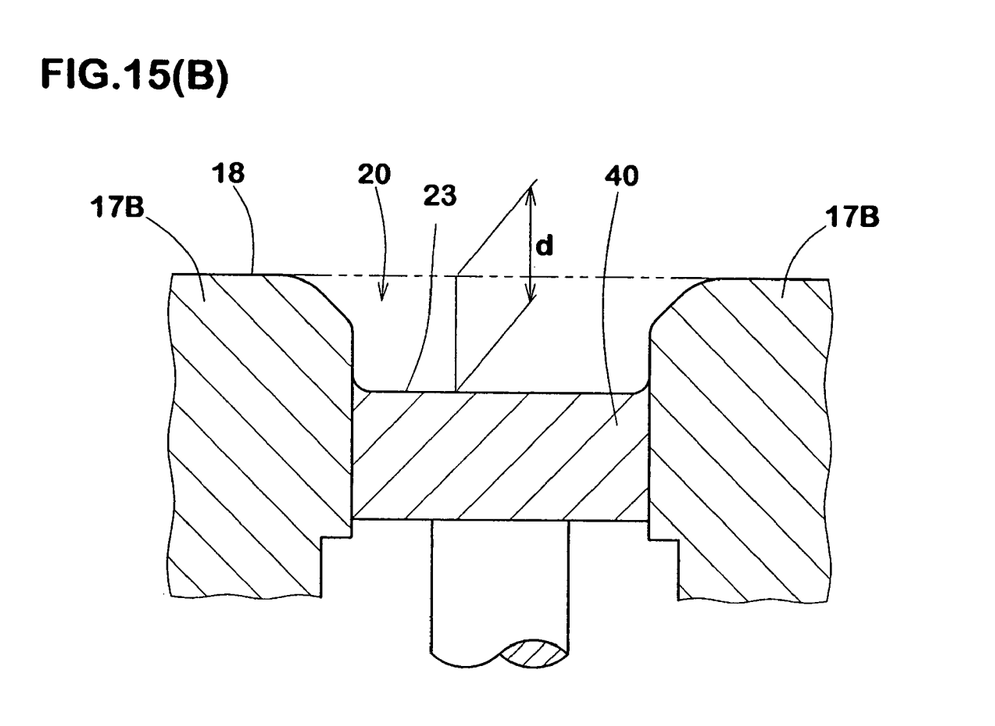

Aside from the above-mentioned elastic membrane, as shown in FIGS. 15(A) and 15(B), a plurality of segments 40 made of a rigid material such as a metal and being movable radially inwardly and outwardly by an actuator (not shown) can be used as the supporting walls 23.

WORKING EXAMPLE

Using the tire building core 12 shown in FIG. 2, a radial tire for passenger cars was manufactured as illustrated in FIGS. 3, 4(A), 4(B), 6, 7 and 8.

| | | |
|---|---|---|
| Tire size: | 195/65R15 | |
| Carcass 6; | a single ply of cords arranged radially at 90 degrees with respect to the tire equator | |
| Belt: | two cross ply steel breaker | |
| Groove 20: | Maximum width | 6.0 cm |
| | Maximum depth | 2.0 cm |
| | Volume | 2,170 cc |
| Expandable damper material 10G: | Shape | Circumferentially continuous strip |
| | Width | 5.0 cm |
| | Thickness | 1.0 cm |
| | Volume | 945 cc |
| | Composition | as follows |
| Halogenated butyl rubber | | 50 phr |
| NR/IR | | 35 phr |
| BR | | 15 phr |

-continued

| | |
|---|---|
| Carbon black | 25 phr |
| Mineral oil | 14 phr |
| Sulfur | 0.6 phr |
| Accelerator | 1.8 phr |
| Zinc oxide | 4 phr |
| Stearic acid | 2 phr |
| Tackifier resin | 2 phr |
| OBSH (blowing agent) *1 | 5 phr |
| Urea based blowing aid *2 | 2 phr |

*1 "Celmike", Sankyo Kasei Co., Ltd.
*2 "Celton N", Sankyo Kasei Co., Ltd.

The invention claimed is:

1. A method for manufacturing a pneumatic tire with a noise damper, comprising the steps of:
   building a raw tire on an annular tire building core, the annular tire building core having a molding face for molding an inner surface of a tread portion of the tire, and said molding face provided with a groove extending in the tire circumferential direction, wherein
   the building of the raw tire includes
      placing an expandable damper material in the groove;
   placing the raw tire, which is built up on the annular tire building core, within a vulcanizing mold together with the core; and
   heating the raw tire, which includes the expandable damper material, so that the raw tire is vulcanized and the expandable damper material expands in the groove, whereby the expanded material forms the noise damper integrated into the radially inside of the tread portion.

2. The method according to claim 1, wherein
   the groove is provided therein with a supporting wall movable in the radial direction between a radially outer position and a radially inner position,
   the placing of the expandable damper material in the groove is carried out in an expanded state that the supporting wall is at the radially outer position so as to support the damper material, and
   the heating of the raw tire is carried out in a contracted state that the supporting wall is at the radially inner position so as to provide a room for expansion of the damper material.

3. The method according to claim 2, wherein
   the supporting wall is formed by an elastic membrane of which back face receives a pressure of a fluid which is controlled such that the pressure is increased in order to move the supporting wall radially outwardly, and the pressure is decreased in order to move the supporting wall radially inwardly.

4. The method according to claim 3, wherein
   the elastic membrane is a part of an annular tube.

* * * * *